United States Patent [19]

Sasaki

[11] Patent Number: 4,734,707

[45] Date of Patent: Mar. 29, 1988

[54] RECORDER WITH DISPLAY INDICATING A SYMBOL FOR TEXT AND GRAPHICAL DATA

[75] Inventor: Ryoichi Sasaki, Nagoya, Japan

[73] Assignee: Brother Kogyo Kabushiki Kaisha, Aichi, Japan

[21] Appl. No.: 849,821

[22] Filed: Apr. 9, 1986

[30] Foreign Application Priority Data

Apr. 13, 1985 [JP] Japan ................................ 60-78791
Apr. 13, 1985 [JP] Japan ................................ 60-78792

[51] Int. Cl.$^4$ ..................... G01D 9/00; G06F 15/626; B41G 3/00
[52] U.S. Cl. ................................ 346/33 R; 364/520; 400/17; 400/18
[58] Field of Search ............... 346/33 R, 17; 364/520; 400/17, 18, 19, 61, 62, 64, 65, 76, 279

[56] References Cited

U.S. PATENT DOCUMENTS 4,642,779 2/1987 Sawada ............................ 346/33 R Primary Examiner—E. A. Goldberg
Assistant Examiner—Mark Reinhart
Attorney, Agent, or Firm—Parkhurst & Oliff

[57] ABSTRACT

A recording apparatus capable of recording characters and graphical representations, having a display which is adapted to display a special symbol together with the characters, so that the special symbol indicate the position of a graphical representation to be recorded before or after a written description or between written descriptions. The apparatus may have a display which has at least one indicator area adapted to effect selective display of each one of numerical values of plural groups of numerical data in a memory, which are recorded in a graphical or tabular form. The desired one of the numerical values of the desired one of the numerical data groups is dsiplayed by designating corresponding one of blocks of a hypothetical table defined by rows and columns. When one block of the hypothetical table is designated while the numerical value corresponding to another block adjacent to that one block is displayed, the numerical value corresponding to the designated block is displayed. Thus, the desired numerical values may be displayed one at a time as if the indicator area and the hypothetical table are moved relative to each other such that the indicator area is moved from one block to another of the hypothetical table.

10 Claims, 27 Drawing Figures

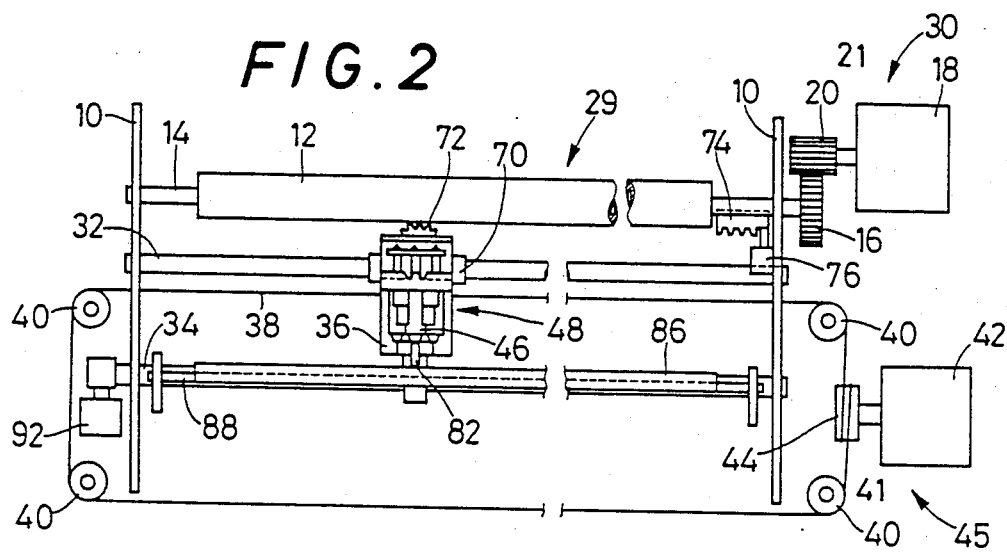
FIG. 2
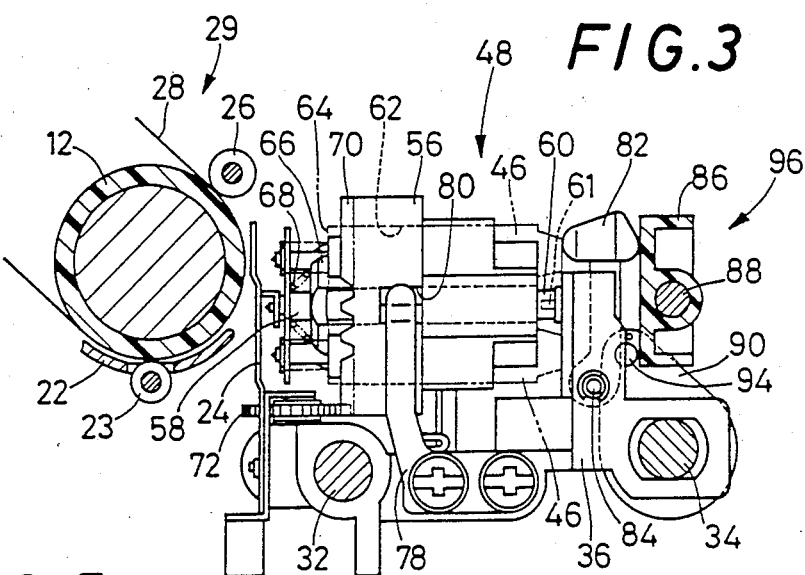
FIG. 3
FIG. 5
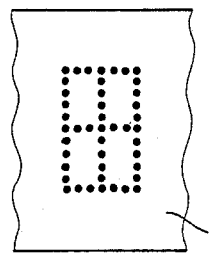

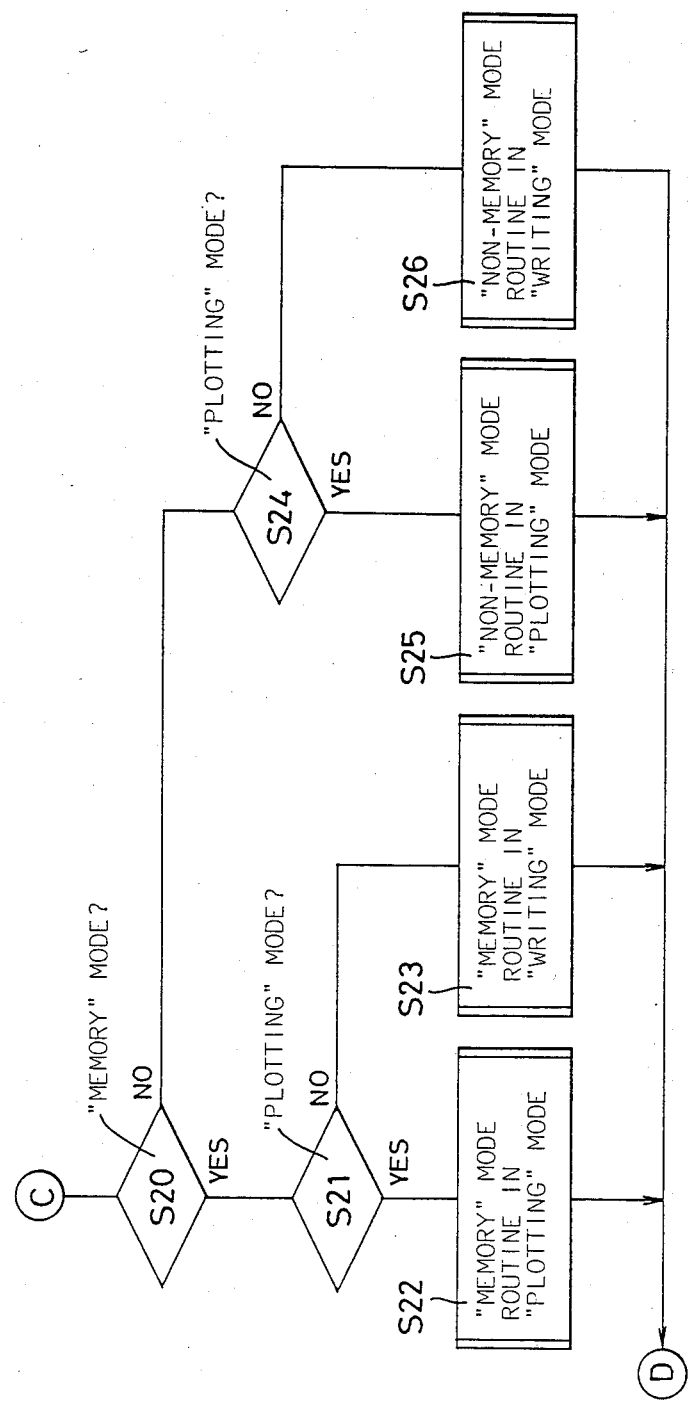

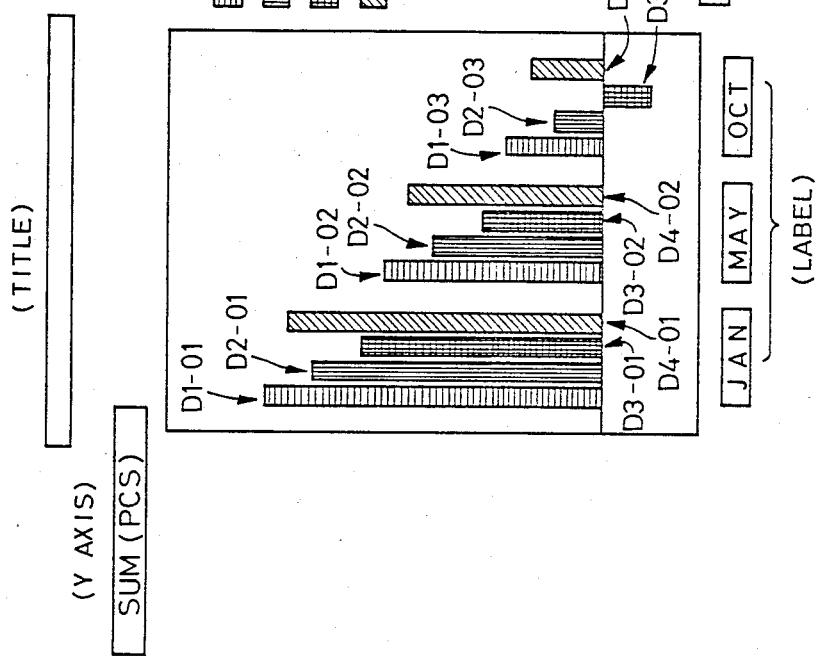

FIG.10
| ◄ GROUP1 DATA ► | ( D1 - 01 ) | ( D1 - 02 ) | ( D1 - 03 ) |
| --- | --- | --- | --- |
| ◄ GROUP2 DATA ► | ( D2 - 01 ) | ( D2 - 02 ) | ( D2 - 03 ) |
| ◄ GROUP3 DATA ► | ( D3 - 01 ) | ( D3 - 02 ) | ( D3 - 03 ) |
| ◄ GROUP4 DATA ► | ( D4 - 01 ) | ( D4 - 02 ) | ( D4 - 03 ) |
FIG.11
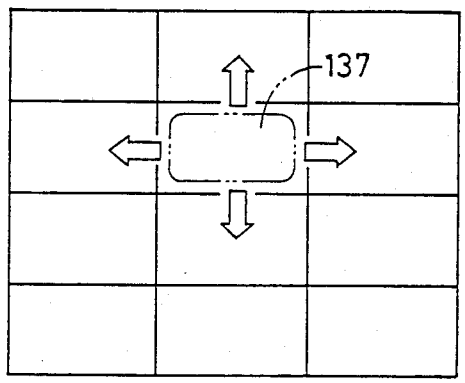
FIG.12
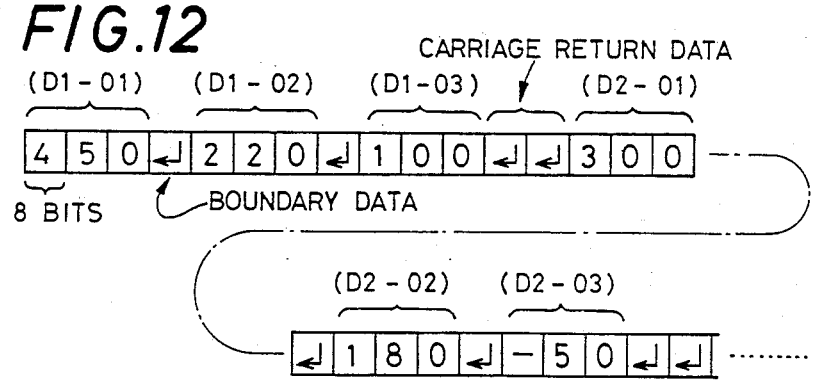

RECORDER WITH DISPLAY INDICATING A SYMBOL FOR TEXT AND GRAPHICAL DATA

BACKGROUND OF THE INVENTION

1. Field of the Art

The present invention relates to a recording apparatus capable of recording characters and graphical representations and/or data tables, and more particularly to a display of the recording apparatus which indicates character data, and numerical data of graphical representations and/or data table.

2. Related Art Statement

There is known a recording apparatus which includes: (a) an input device through which character data representing characters and graph data representing graphs are entered; (b) display means for displaying the character data and the graph data entered through the input device; (c) a memory for storing the character data and the graph data entered through the input device; (d) a recording mechanism for effecting relative movements of a recording instrument and a recording medium, for recording the characters and graphs represented by the character and graph data; and (e) control means for controlling the display means and the recording mechanism according to the character data and the graph data, respectively.

In a recording apparatus of the type indicated above, there arises a need of plotting a graph between written descriptions or between adjacent groups of statements or words. In such instance, graph data defining a graph should be entered by interrupting the entry of a batch of character data for the written descriptions or statements. With the interruption of entry of the character data, the graph data is displayed on the display means in place of the character data which has been displayed. In this condition, the display means does not enable the operator to check the position in which the graph data is inserted, namely, the position of the graph in relation to the adjacent written descriptions or statements.

Also known in the art is a similar recording apparatus capable of recording graphical representations and/or data tables, including: (a) an input device through which plural groups of numerical data are entered for one of the graphical representations and/or data tables, each one of the plural groups of numerical data consisting of a plurality of numerical values; (b) a memory for storing the plural groups of numerical data entered through the input device; (c) a recording mechanism for effecting relative movements between a recording instrument and a recording medium, for recording the graphical representations and/or data tables; and (d) recording control means for controlling the recording mechanism according to the plural groups of numerical data stored in the memory. Usually, the recording apparatus uses a display device which is adapted to display the entered numerical values. For reduced cost, size and weight of the apparatus, the display device has a relatively small display area which covers a portion of the entered numerical data, namely, the display area is not large enough to display all of the entered numerical values at one time.

In a recording apparatus of the type indicated above, the operator feels difficulty in grasping the entered numerical data as a whole, because the display area is relatively small. This inconvenience is particularly serious where the numerical data consists of a large number of numerical values. Further, with the small display device, it is not easy to accomplish editing or correction of the numerical data stored in the memory.

SUMMARY OF THE INVENTION

It is therefore a first object of the present invention to provide a recording apparatus for recording characters and a graphical representation, having a display which is adapted to indicate the position of the graphical representation in relation to the characters.

A second object of the invention is to provide a recording apparatus capable of recording numerical values in a graphical or tabular form, having a display with a relatively small display area which permits easy selective display of the numerical values.

The first object of the invention is achieved by a recording apparatus capable of recording characters and graphical representations on a recording medium with a recording instrument, comprising: (a) an input device through which character data and graph data are entered; (b) display means for displaying the character data and the graph data entered through the input device; (c) memory means for storing the character data and the graph data entered through the input device; (d) a recording mechanism for effecting relative movements between the recording instrument and the recording medium, for recording the characters and the graphical representations on the recording medium with the recording instrument; and (e) control means for controlling the display means and the recording mechanism according to the character data and the graph data. The memory means comprises a text memory for storing the character data, and a graph memory for storing the graph data, the text memory further storing a set of special symbol data indicative of a storage of the graph data in the graph memory. The special symbol data corresponds to each one of the graphical representations. The control means controls the display means so as to display a special symbol represented by the special symbol data, together with the characters represented by the character data.

In the recording apparatus of the invention constructed as described above, when graph data for a graphical representation is entered during an entry of character data, the special symbol data is stored in the text memory, following the character data which has been entered before the graph data is entered. Therefore, the special symbol represented by the special symbol data is displayed on the display means, together with the characters, thus permitting the operator to know the position at which the graphical representation is inserted part way through the written description represented by the character data.

According to one embodiment of the invention, the control means is adapted to inhibit the recording mechanism from recording the special symbol, when the recording mechanism is activated to record the characters according to the character data.

According to another embodiment of the invention, the apparatus further comprises means for erasing the graph data in the graph memory when the special symbol data in the text memory is erased.

According to an advantageous embodiment of the invention, the input device comprises operator-controlled means for displaying on the display means the graph data in place of the special symbol. When the operator-controlled means is operated while the special symbol is displayed on the display means, the control means retrieves the graph data from the graph memory and causes the display means to display the graph data. In this case, the operator-controlled means is operated when it is desired to verify or edit the graph data.

According to a still further embodiment of the invention, the control means comprises a graph-designating memory pointer whose count is incremented each time the special symbol data is stored in the text memory together with the graph data for each of the graphical representations. The graph memory has a plurality of memory locations for storing plural batches of graph data corresponding to the graphical representations, respectively. In the meantime, the input device includes operator-controlled means for changing the content of the memory pointer. The control means retrieves one of the plural batches of graph data from one of the memory locations of the graph memory which is designated by the content of the memory pointer. The control means operates the display means to display the retrieved batch of graph data.

The second object of the invention is achieved by a recording apparatus capable of recording graphical representations and/or data tables on a recording medium with a recording instrument, comprising: (a) an input device through which plural groups of numerical data are entered for one of the graphical representations and/or data tables, each one of the plural groups of numerical data consisting of a plurality of numerical values; (b) memory means for storing the plural groups of numerical data entered through the input device; (c) a recording mechanism for effecting relative movements between the recording instrument and the recording medium, for recording the graphical representations and/or data tables on the recording medium with the recording instrument; (d) recording control means for controlling the recording mechanism according to the plural group of numerical data stored the memory means; (e) display means including at least one indicator area adapted to display the numerical values of the plural groups of numerical data, one value at a time; (f) designating means for designating one of a plurality of blocks of a hypothetical table which is defined by a plurality of rows and a plurality of columns, the blocks of the hypothetical table accommodating the numerical values of the plural groups of numerical data, respectively, the display means displaying the numerical values on the indicative area when the corresponding blocks are designated by the designating means; and (g) indication control means which is operable while one of the numerical values which corresponds to the above-indicated one block designated by the designating means is displayed on the indicator area of the display means. The indication control means is adapted to retrieve from the memory means another of the numerical values of the plural groups of numerical data which corresponds to another block of the hypothetical table that is located adjacent to the above one block, when this another block is designated by the designating means. The indication control means operates the display means to display on the indicator area the above-indicated another numerical value retrieved from the memory means, whereby this another numerical data is displayed as if the indicator area and the hypothetical table are moved relative to each other such that the indicator area is moved from the above-indicated one block to the above-indicated another block of the hypothetical table.

In the recording apparatus constructed as described above, a desired one of the numerical values of a desired one of the plural groups of numerical data may be displayed on the indicator area of the display means, by designating the corresponding one of the blocks of the hypothetical table with the designating means. The desired numerical value is displayed on the indicator area as if the designating means moves the indicator area from the current block of the hypothetical table to another block corresponding to the numerical value to be displayed, or as if the designating means moves the hypothetical table so that the above-indicated another block is aligned with the indicator area. Thus, the present arrangements permits the operator to check the numerical values of a graphical representation or data table, allowing easy recognition of the group of numerical data to which each numerical value belongs. In other words, the numerical values which are represented by a graph or listed in a data table, may be recognized as if the numerical values are accommodated in the respective blocks of the hypothetical table. Accordingly, the instant arrangement enables the operator to easily check, correct or edit the numerical data of the graph or data table.

In accordance with one embodiment of the above recording apparatus of the invention, the input device comprises operator-controlled means which is operated for storing a set of boundary data following each one of said numerical values of each group of the numerical data in the memory means, and for storing a set of carriage return data following each one of the plural groups of numerical data in the memory means. The indication control means retrieves the above-indicated another numerical value from the memory means according to the set of boundary data if the above-indicated another block is in the same row as the above-indicated one block, or according to the set of boundary data and the set of carriage return data if the above-indicated another block is in the same column as the above-indicated one block. In one form of this embodiment, the carriage return data consists of two successive sets of the boundary data.

According to another embodiment of the same recording apparatus, the memory means comprises a first graph memory for storing a batch of the plural groups of numerical data for the graphical representation or table which has been entered last, and a second graph memory for storing plural batches of numerical data each of which is transferred from the first graph memory when the batch of numerical data for each new graphical representation or table is entered through the input device into the first memory.

BRIEF DESCRIPTION OF THE DRAWING

These and other objects and many attendant advantages of this invention will be readily appeciated as the same becomes better understood by reference to the following detailed description when considered in connection with the accompanying drawing, in which:

FIG. 2 is a schematic plan view of a recording mechanism of the typewriter of FIG. 1;

FIG. 3 is an enlarged elevational side view partly in cross section of a pen-holding head and its vicinities;

FIG. 5 is a view illustrating an example of a special symbol indicated on a display of the typewriter;

FIGS. 6A, 6B and 6C are flow charts illustrating programs for controlling the operation of the typewriter, associated with the present invention;

FIG. 9 is a view showing an example of a graph to be recorded on the typewriter;

FIG. 10 is an illustration of a hypothetical table consisting of blocks in which numerical values of graph data for the graph of FIG. 9 are accommodated;

FIG. 11 is an imaginary relation between an indicator area of the display and the blocks of the hypothetical table of FIG. 10;

FIG. 12 is an illustrative view of a part of a first graph memory, indicating sets of numerical data of the graph data corresponding to the blocks of the hypothetical table of FIG. 10;

DETAILED DESCRIPTION OF THE PREFERRED EMBODIMENT

Referring to the accompanying drawing, a preferred embodiment of the invention will be described in detail.

Figure 1:
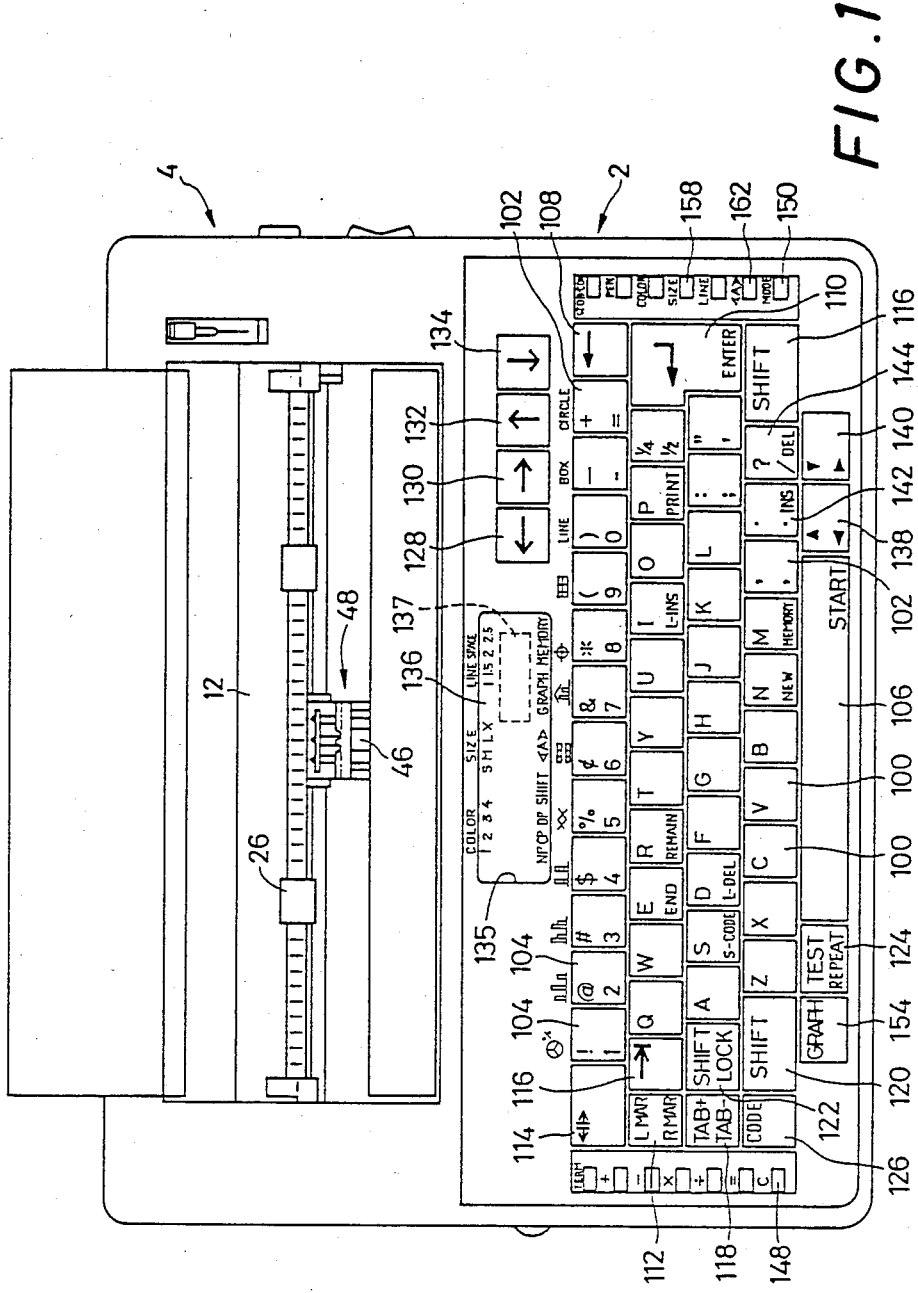
FIG. 1 is a schematic plan view of one embodiment of a recording apparatus of the invention in the form of a typewriter having a keyboard and using ball-point pens as writing instruments.

In a plan view of FIG. 1, there is shown one embodiment of a recording apparatus of the invention in the form of a typewriter which uses ball-point pens (described later) as writing instruments. The typewriter has a keyboard 2 at its front half, and a recording section 4 at its rear half.

The recording section 4 has a recording mechanism which is schematically illustrated in FIG. 2, wherein reference numerals 10 designate a pair of opposed side frames of a main housing structure of the typewriter. These side frames 10 support rotatably a shaft 14 of an elongate cylindrical platen 12 which serves as a paper support member. The shaft 14 has a gear 16 fixed to one end thereof. The gear 16 meshes with a pinion 20 which is fixed to an output shaft 21 of a platen drive motor 18. The platen 12 is rotated by the motor 18 in selected one of opposite directions, i.e., either forward or reverse direction. The platen 12 cooperates with a paper pan 22, presser rollers 23, a paper guide 24, paper bail rollers 26, and other parts, to constitute a paper support device 29 which is adapted to guide and support a sheet of recording paper 28 along the circumferential surface of the platen 12. Thus, the gear 16, motor 18 and pinion 20 constitute a major part of a paper feeding device 30 for feeding the sheet of paper 28 in the Y-axis direction perpendicular to an axis of rotation of the platen 12.

Two mutually parallel guide rods 32, 34 extend parallel to the platen 12 between the opposed side frames 10. These two guide rods 32, 34 support a carriage 36 slidably along the length of the rods 32, 34. A carriage drive wire 38, which is fixed at its opposite ends to the carriage 36, is guided in a loop by four idler guide rollers 40. The drive wire 38 is wound on a driven pulley 44 fixed to an output shaft 41 of a carriage drive motor 42. With bidirectional rotary movements of the drive motor 42, the loop of the drive wire 38 is rotated in the corresponding directions, whereby the carriage 36 is reciprocated in opposite directions along the axis of the platen 12, i.e., in the X-axis direction perpendicular to the Y-axis along which the sheet of paper 23 is fed by the paper feeding device 30. The carriage 36 carries a multi-station indexable pen-holding head 48 which supports plural ball-point pens 46. In this arrangement, the ball-point pens 46 are moved in the X-axis direction when the carriage 36 is reciprocated. The guide rods 32, 34, carriage 36, drive wire 38, guide rollers 40, carriage drive motor 42, and pulley 44 constitute a major part of a pen driving device (carriage reciprocating device) 45 for moving the ball-point pens 46 in the X-axis direction. With the X-axis movements imparted to the pens 46 by this driving device 45, in combination with the Y-axis movements of the sheet of paper 28 imparted by the paper feeding device 30, the pens 46 on the carriage 36 are movable in any directions relative to the sheet of paper 28, whereby desired characters such as letters and symbols, and desired graphs may be recorded, i.e., written or plotted on the sheet of paper 28.

The multi-station indexable pen-holding head 48 is constructed as shown in FIG. 3. The pen-holding head 48 includes a holder body 56 which is supported on the carriage 36 rotatably on indexably about its axis substantially perpendicular to the axis of the platen 12. Stated more particularly, the pen holder body 56 has a short shaft 58 extending from its one end on the side of the platen 12, and a boss 60 formed at its other end. The short shaft 58 is rotatably supported by the paper guide 24, while a projection 61 extending from the carriage 36 is fitted in a recess formed in the boss 60 of the holder body 56. Thus, the holder body 56 is rotatably supported on the carriage 36. The holder body 56 has four pen holes 62 which are formed in evenly spaced-apart relation with each other in the circumferential direction of the holder body 56. In other words, the pen holes 62 are equiangularly spaced from each other along a circle whose center is alinged with the axis of rotation of the holder body 56. The four pen holes 62 accommodate the respective four ball-point pens 46 of different colors so that they are axially slidable in the holes 62. Thus, the holder body 56 carries the four ball-point pens 42. The end portion of each pen 46 on the side of its writing tip is smaller in diameter than the remaining portion, and terminates at a shoulder 64 on which a biasing force of a return spring 68 is exerted via a commonly used return plate 66.

The holder body 56 is provided, at its front end of the side of the platen 12, with a gear 70 which meshes with a pinion 72 supported on the carriage 30 rotatably about a vertical axis. As shown in FIG. 2, a stationary rack 74 is disposed adjacent to the right-hand side end (as viewed in FIG. 2) of the platen 12. Each time the pinion 72 is rotated by the rack 74, the holder body 56 is indexed so that each pen 46 may be brought into its writing position, i.e., the uppermost position at which the axis of the pen 46 is substantially normal to the surface of the platen 12. The rack 74 is operated by a solenoid 76, between its operative position in which the rack 74 engages the pinion 72, and its inoperative position in which the rack 74 is located away from the pinion 72. The holder body 56 is precisely positioned at each of the four index positions, by means of resilient engagement of a positioning spring 78 with the appropriate one of four V-notches 80 formed in the circumferential surface of the holder body 56 as indicated in FIG. 3.

A hammer 82 is disposed behind the holder body 56, and supported on the carriage 36 pivotably about a pin 84. Behind the hammer 70 is disposed a hammer drive plate 86 which is pivotable about a shaft 88. In the meantime, the guide rod 34 has a lever 90 fixed thereto, and the lever 90 has a pin 94 fixed thereto. When the guide rod 34 is rotated clockwise (as seen in FIG. 3) upon activation of a latching solenoid 92 (FIG. 2) connected thereto, the hammer drive plate 86 is pivoted counterclockwise (as seen in FIG. 3) by the pin 94, and consequently the hammer 82 is pivoted in the same direction. As a result, the hammer 82 advances the currently selected ball-point pen 46 against the biasing force of the return spring 68 until the writing tip of the pen 46 contacts the surface of the sheet of paper 28. At this time, the return plate 66 in flexed by a predetermined angle to permit the pen 46 to advance. The hammer 82, drive plate 86, lever 90, solenoid 92, constitute a device for reciprocating the selected ball-point pen 46 between its advanced position in which its writing tip contacts the paper 28, and its retracted position in which the writing tip is separated from the paper 28.

Referring back to FIG. 1, the keyboard 2 will be described. Like a keyboard as used for ordinary typewriters known in the art, the keyboard 2 has a multiplicity of character keys such as aliphatic keys 100, symbol keys 102 and numeral keys 1104 and further has various function keys such as a space key (bar) 106, a backspace key 108, a carriage return key 110, a margin set key 112, a margin release key 114, a tab key 116, a tab set key 118, a shift key 120, a shift-lock key 122, a repeat key 124, a code key 126, carriage-jog keys 128, 130 (for moving the pen 46 to the left and to the right, respectively), the platen-jog keys 132, 134 (for feeding the sheet of paper 28 upward and downward, respectively).

In an upper central part of the keyboard 2, there is provided a generally elongate rectangular liquid crystal display 136 which has a 15-digit capacity. As the character keys are operated successively, the corresponding characters are displayed on the display 136. The already displayed characters and a cursor on the display 136 are sequentially shifted one position to the right each time a new character is keyed in. After the display 136 is filled with fifteen characters, the display 136 is overflowed, so that the rightmost character displayed on the display 136 disappears each time a new character (sixteenth or the following character) is keyed in.

The keyboard 2 further comprises a graph key 154 which serves as a WRITING/PLOTTING selector key for selecting a WRITING mode for writing characters, or a PLOTTING mode for plotting graphs. The graph key 154 selects the WRITING and PLOTTING modes alternately upon repeated depression thereof. When the WRITING mode is selected, the typewriter is operable in one of three modes: DIRECT PRINT, CORRECTION PRINT, and NON-PRINT modes (hereinafter referred to as "DP mode", "CP mode" and "NP mode", respectively) which are selected by a mode selector key 150. In the DP mode, characters are displayed on the display 136 and written on the paper 28 simultaneously when the characters are keyed in through the keyboard 2, as in an ordinary typewriter. In the CP mode, keyed-in characters are not written as long as they are displayed on the display 136, that is, the keyed-in and displayed characters are written as they overflow from the display 136. In this CP mode, the characters displayed on the display 136 may be corrected and edited by using cursor keys 138, 140, and an insert key 142 and a delete key 144 which are operated with the code key 126 to effect insertion and deletion of the desired characters at the positions designated by the cursor on the display 136. The cursor keys 138, 140 are used to move the cursor on the display 136. The NP mode is identical with the CP mode, except that the keyed-in and displayed characters will not be written even after the display 136 is overflowed. A clear key 148 is used to clear the display 136.

The instant typewriter is also operable in a MEMORY mode which is established by operating a MEMORY key, i.e., by simultaneous depression of the alphabetic key "M" 100 and the code key 126. With the typewriter set in the MEMORY mode, the keyed-in characters are stored in a TEXT memory 152 (which will be described referring to FIG. 5) as they are displayed and written when in the DP mode, or as they overflow from the display 136 when in the CP mode or NP mode. The characters keyed in and displayed in the NP mode are stored in the TEXT memory 152, without printing thereof on the paper 28. In the MEMORY mode, the characters currently displayed on the display 136 in the CP or NP mode may be edited in the previously described manner. Further, the already stored lines of characters may also be edited in all of the three modes including the DP mode. More specifically, the cursor keys 138, 140, when operated alone, serve as CURSOR LEFT and CURSOR RIGHT keys which move the cursor leftward and rightward, respectively. However, when the CURSOR LEFT and CURSOR RIGHT keys 138, 140 are operated together with the code key 126, these keys 138, 140 serve as CURSOR UP and CURSOR DOWN keys, which move the cursor up and down to the desired one of the already stored lines preceding the currently displayed line. Thus, a previously stored line may be displayed on the display 136. After the editing or correction of a previous line is completed, the cursor may be returned to the current line of characters by operating the cursor key 140 together with the code key 126. The MEMORY mode is cancelled by operating an END key, i.e., by operating the alphabetic key "E" 100 together with the code key 126, whereby the typewriter is restored to the normal WRITING mode.

As previously indicated, the PLOTTING mode is established by operating the graph key 154 while in the WRITING mode. In the plotting mode, graphs, tabulations or other representations may be prepared. The PLOTTING mode is changed to the WRITING mode by operating the graph key 154 again. The numeral keys 104 corresponding to numerals "1" through "0", and the symbol keys 102 corresponding to symbols "−" and "=", are respectively assigned to select: circular graph (pie chart); simple bar graph; bar graph for a plurality of data groups; vertical band graph; broken-line graph; horizontal band graph; combination bar/broken-line graph; radar chart; tabulation (table of data); a segment defined by two points; a rectangle by a diagonal line defined by two points; and a circle defined by a center point and a point on the circumference. The above radar chart, segment, rectangle and circle are hereinafter referred to as "figures". When the PLOTTING mode is selected by the graph key 154, the display 136 provides a prompting or interrogating message asking the operator to select the kind of plotting operation to be performed. At this time, the desired graph, tabulation or figure may be selected by the corresponding key 104, 102. After the specific plotting or tabulating operation is selected by the appropriate numeral key 104 or symbol key 102, the numeral keys 104 function as the keys for entering numerical values which are presented in the designated graphical form (graph or figure) or in the designated tabular form (data table). In this PLOTTING mode, the keyed-in numerals are shifted on the display 136 from right to left each time a digit is entered. Each entry of numerical values is stored into a first graph memory 188 (which will be described) by operating the carriage return key 110. Namely, the carriage return key 110 serves as an ENTER key if activated in the PLOTTING mode. When the space key 106 and the code key 126 are operated simultaneously after all numerical values for a graph, for example, are entered, the plotting of that graph is started. If the repeat key 124 and the code key 126 are operated together after the entry of the numerical data, it is possible to check a range of plotting movements of the ball-point pen 46, with the pen 46 moving in spaced-apart relation with the paper 28 (with the pen 46 placed in its retracted position), so as to indicate paths to be taken according to the entered numerical data.

At the right-hand side end of the keyboard 2, there are disposed several keys above the move selector key 150. These keys are provided for selecting writing/plotting conditions, and include a size selector key 158 for designating the size of the characters to be written in the WRITING mode, and a vector key 162 to select one of three character postures in the WRITING mode: a normal upright posture; a counterclockwise turned posture which is rotated counterclockwise 90 degrees with respect to the upright posture; and a clockwise turned posture which is rotated clockwise 90 degrees with respect to the upright posture. In the PLOTTING mode, these keys 158 and 162 designate the size and posture of a graph or figure to be plotted. The display 136 provides, at its top and bottom, indications of the currently selected modes and writing/plotting conditions.

Figure 4:
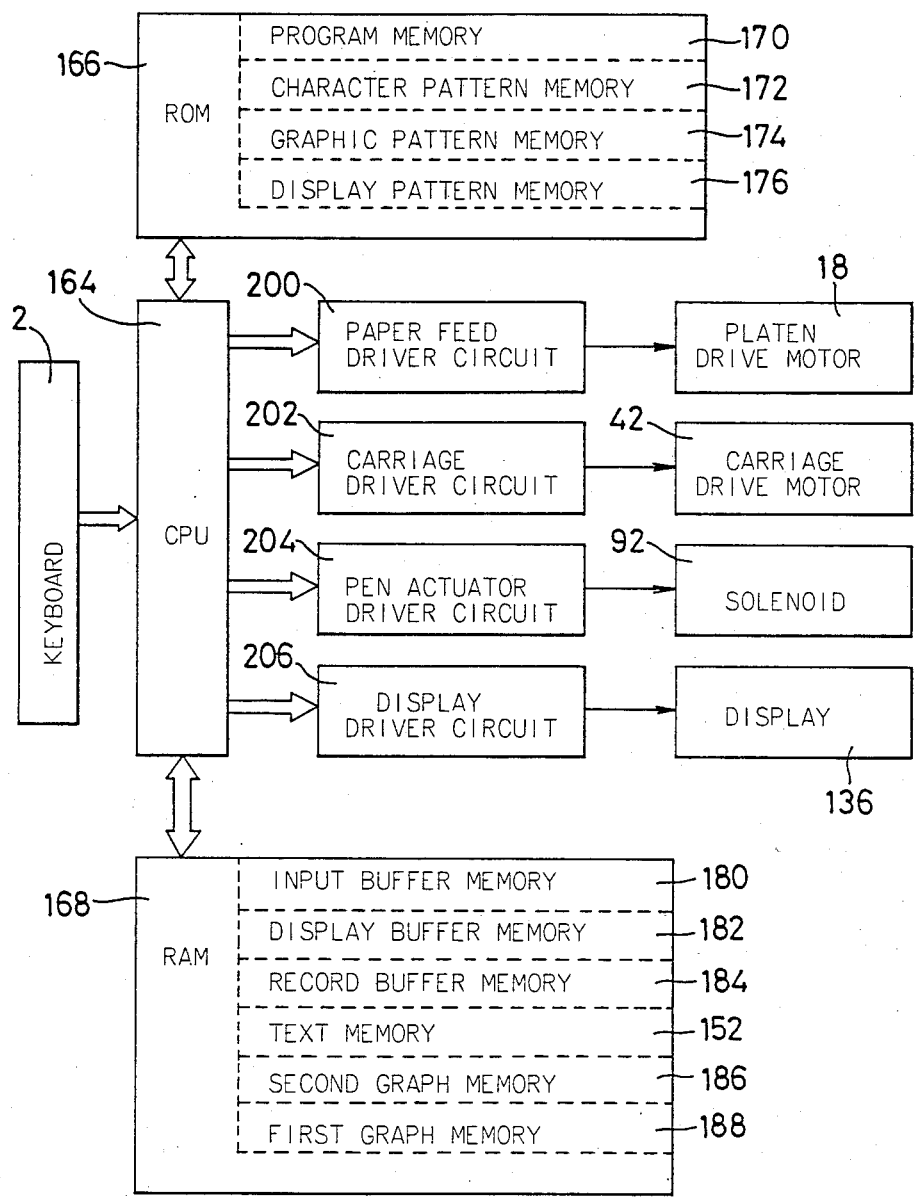
FIG. 4 is a block diagram of a control system for the typewriter of FIG. 1.

FIG. 4 shows a control system for controlling the recording section 4 and the display 136, according to input signals from an input device in the form of the keyboard 2. In the figure, reference numeral 164 designates a central processing unit (hereinafter referred to as CPU), to which is connected the keyboard 2. Also connected to the CPU 164 are a read only memory (hereinafter referred to as ROM) 166 and a random access memory (hereinafter called RAM) 168. The ROM 166 includes a program memory 170 storing programs shown in FIGS. 6 and 13, and other programs for controlling the operation of the typewriter. The ROM 166 further includes a character pattern memory 172 which stores multiple sets of character pattern data representative of patterns of the characters which are keyed in through keyboard 2, and a graphic pattern memory 174 which stores sets of graphic pattern data representative of graphic patterns and tabulation form which are designated through the numeral and symbol keys 104, 102 ("0" through "9", "−" and "=") previously described. The ROM 166 further includes a display pattern memory 176 which stores display pattern data representative of pattern such as letters, numerals and symbols to be displayed on the display 136.

The RAM 168 includes: an input buffer memory 180 for temporarily storing coded data which are keyed in through the keyboard 2; a display buffer memory 182 for storing coded data for the characters to be displayed on the display 136; a record buffer memory 184 for temporarily storing coded data for the characters to be recorded by the recording section 4; the previously indicated text memory 152 for storing a relatively large batch of keyed-in coded data entries; the previously indicated first graph memory 188; and a second graph memory 186 storing a batch of numerical data which is transferred from the first graph memory 188. The text memory 152, and the first and second graph memories 188, 186 constitute memory means for storing character data to be written and graph data to be plotted.

The first graph memory 188 is adapted to store a batch of graph data which are entered through the keyboard 2 in the PLOTTING mode. Each batch of graph data consists of plural groups of numerical data, and character data representative of characters if used in the graph representing the numerical data. Each group of mumerical data consists of a plurality of numerical values, as described later in detail. The second graph memory 186 is adapted to store plural batches of graph data, each batch being transferred from the first graph memory 188 in the MEMORY mode while in the PLOTTING mode. When the graph key 154 is operated together with the code key 126, the last batch of graph data, i.e., the graph data stored in the first memory 188 is displayed on the display 136, and may be edited and/or recorded on the paper 28. That is, the graph data which has been entered last is temporarily stored in the first graph memory 188 (not immediately stored in the second memory 186), and therefore needs not be retrieved from the second memory 186 when the graph data is edited or plotted.

The text memory 152 is adapted to store a set of special symbol data representative of a special symbol as indicated in FIG. 5. This special symbol data is stored into the text memory 152 when the PLOTTING mode is cancelled. The special symbol data is one of character pattern data stored in the character pattern memory 172 of the ROM 166, and is displayed on the display 136 in the same manner as the other characters (symbols).

There are also connected to the CPU 164 a paper feed driver circuit 200, a carriage driver circuit 202, a pen actuator driver circuit 204, and a display driver circuit 206, to which are respectively connected the platen drive motor 18, carriage drive motor 42, solenoid 92, and display 136. In response to input signals from the keyboard 2, the CPU 164 controls the driver circuits 200, 202, 204 and 206, according to the programs and pattern data stored in the ROM 166, and by utilizing data storage functions of the RAM 168.

Figure 6A:
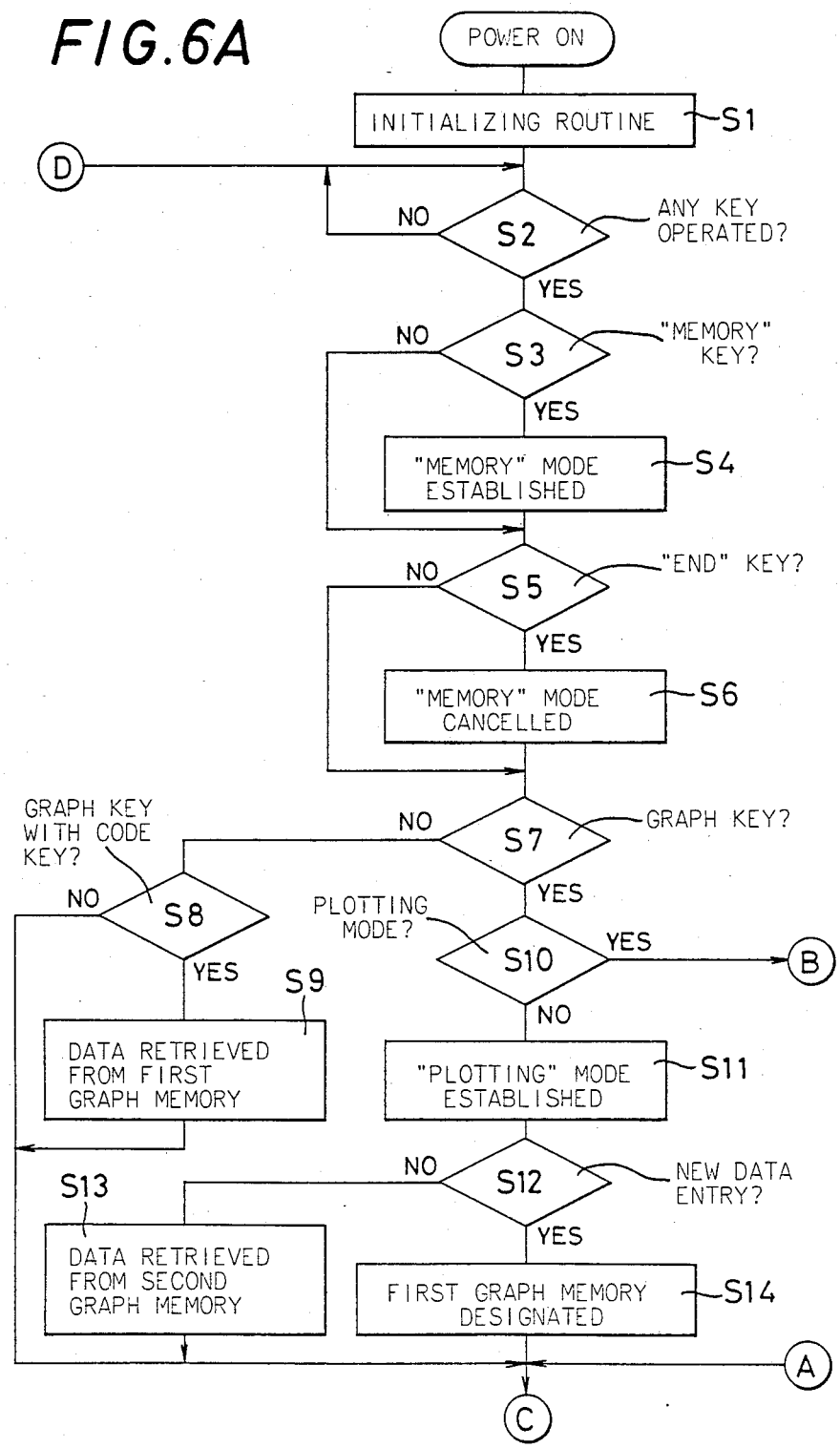
Figure 6B:
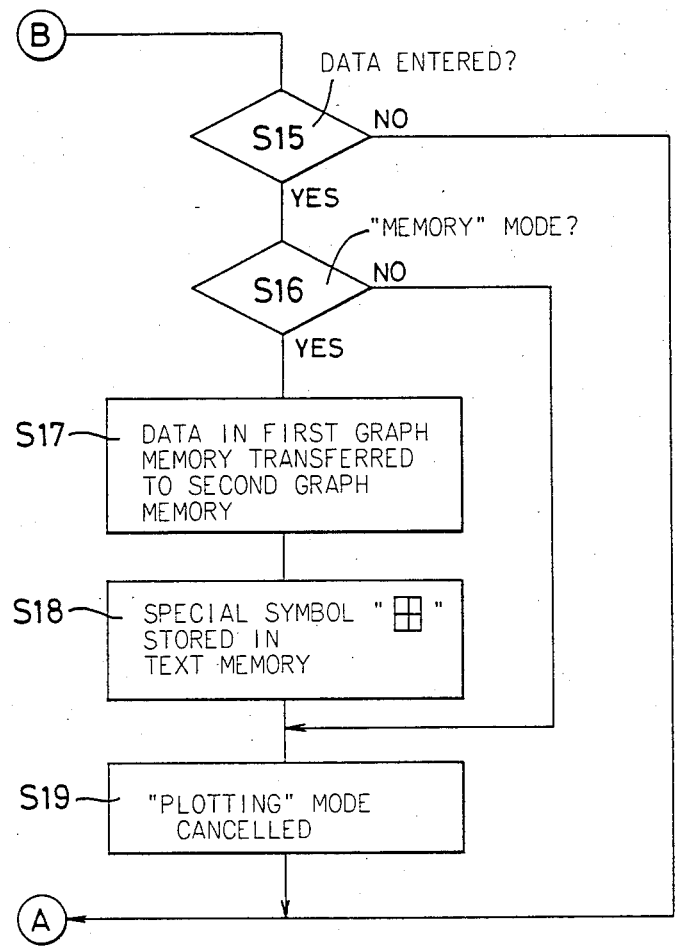

The operation of the typewriter constructed as described hitherto will be described referring to the flow charts of FIGS. 6A, 6B and 6C.

Upon application of power to the typewriter, the CPU 164 executes step S1 (FIG. 6A) to implement an initializing routine in which the typewriter is placed in the WRITING mode and in a NON-MEMORY mode (in which the MEMORY mode is not established). Subsequently, the CPU 164 goes to step S2, which is repeatedly executed to check if any key on the keyboard 2 is operated. If the MEMORY key is operated in this condition, that is, if the alphebetic key "M" 100 and the code key 126 are operated simultaneously, the CPU 164 goes to step S4 in which the MEMORY mode is established. On the other hand, if the END key is operated, that is, if the alphabetic key "E" 100 and the code key 126 are operated together, the CPU 164 goes to step S5 and to step S6 to cancel the MEMORY mode which has been established.

If the graph key 154 is operated, step S10 is executed to check if the typewriter is placed in the PLOTTING mode or not. Since the typewriter is now placed in the WRITING mode (not placed in the PLOTTING mode), the CPU 164 goes to step S11 to establish the PLOTTING mode. Successively the CPU 164 goes to step 12 and then to step S13 or S14. These steps will be described later in detail. In the case where the graph key 154 is operated while the typewriter is placed in the PLOTTING mode, the judgement in step S10 becomes affirmative (YES), whereby the CPU 164 goes to step S15 (FIG. 6B) to check if the operation of the graph key 154 has occurred after any data has been entered. More specifically, if the graph key 154 is operated twice sucessively without data entry between the operations of the key 154, the typewriter which is initially placed in the WRITING mode is once set in the PLOTTING mode and then restored to the WRITING mode. Step S15 is provided to check if the graph key 154 has been operated twice successively. If so, the CPU 164 skips the following steps S16 through S19, so that the second depression of the graph key 154 has no effect. If the graph key 154 is operated after any data has been entered in the PLOTTING mode, the judgement in step S15 is affirmative, and the following steps S16-S19 will be executed. These steps will be described later.

If the graph key 154 and the code key 126 are operated simultaneously, the CPU 164 goes to step S9 to retrieve data from the first graph memory 188. This step will also be described.

Figure 13:
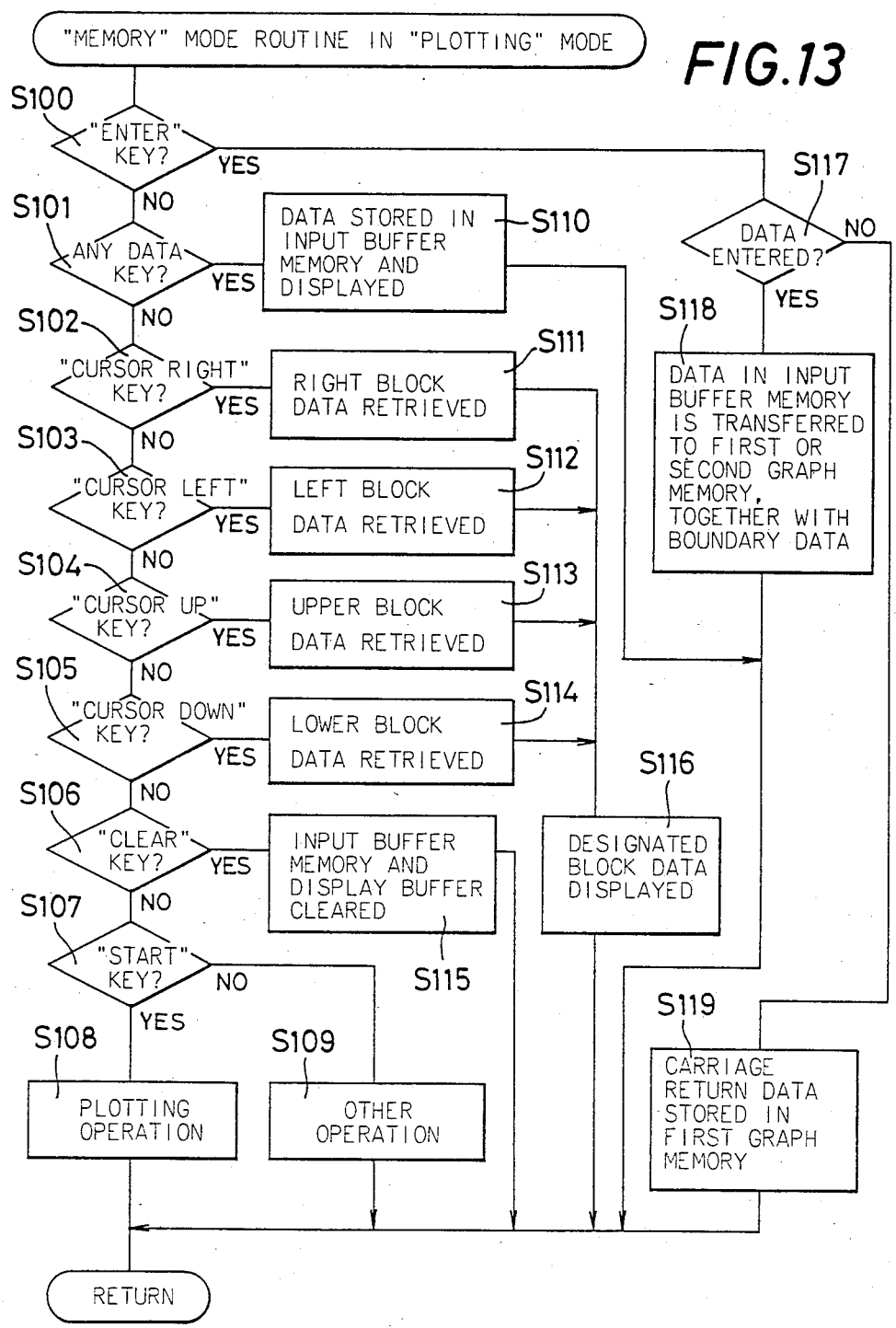
FIG. 13 is a flow chart illustrating programs for storing and retrieving the graph data.

The mode in which the typewriter is currently placed is checked in steps S20, S21 and S24 (FIG. 6C). The CPU 164 executes different rountines in steps S22, S23, S25 and S26, depending upon the result of checking in steps S20, S21 and S24. The flow chart in FIG. 13 shows the MEMORY mode routine of step S22 in the PLOTTING mode. In the interest of brevity and simplification, the flow chart in FIG. 13 does not include steps associated with indications on the display 136 to prompt the operator to proceed with storing graph data for a desired graphical representation.

In this specific example, a batch of graph data for a bar graph as indicated in FIG. 9 is entered and stored. The graph data consists of four groups of numerical data, D1 through D4 corresponding to GROUP 1, GROUP 2, GROUP 3 and GROUP 4 which relate to COMPANIES A, B, C and D, respectively. Each group of numerical data consists of three numerical values 01-03. Therefore, the instant batch of graph data consists of a total of twelve numerical values. For easy understanding of the invention, a hypothetical table as indicated in FIG. 10 is imagined. The hypothetical table consists of twelve blocks which are defined by four rows corresponding to the four groups of numerical data (GROUP 1 Data; GROUP 2 Data; GROUP 3 Data; and GROUP 4 Data), and three columns corresponding to the three numerical values of each group, which represent, for example, quantities of certain products manufactured by COMPANIES A, B, C and D in January, May and October, respectively, as indicated in FIG. 9. The twelve numerical values are supposed to be accommodated in the corresponding twelve blocks of the hypothetical table of FIG. 10.

The liquid crystal display 136 has a screen 135 which includes an indicator area 137 adapted to display each one of the twelve numerical values of the graph data (accommodated in the corresponding blocks of the hypothetical table), one at a time, when the corresponding block of the table is designated by the cursor keys 138 and 140, which serve as the CURSOR LEFT and CURSOR right keys when operated alone, or as the CURSOR UP and CURSOR DOWN keys when operated with the code key 126, as previously discussed. Namely, these CURSOR LEFT, RIGHT, UP and DOWN keys, when operated in the PLOTTING mode, function as designating means for designating one of the blocks of the hypothetical table which is located to the left or right, or above or below the block whose numerical value is currently displayed on the indicator area 137 of the display 136, as indicated in FIG. 11.

When the graph key 154 is operated as previously indicated, the CPU 164 executes steps S10, S11, S12 and S14 (FIG. 6A), whereby the typewriter becomes ready to store a batch or graph data into the first graph memory 188. In addition, the display 136 provides a prompting message asking the operator of a desired kind of the graph to be plotted. Since the graph indicated in FIG. 9 is a bar graph to be selected by the numeral key "3" 104, this numeral key "3" is operated. As a result, the MEMORY mode routine of step S22 illustrated in FIG. 13 will be started.

In response to the operation of the numeral key "3", the judgement in step S101 becomes affirmative, and the CPU 164 executes step S110 wherein the numerical value "3" is stored in the input buffer memory 180 while the numeral "3" is displayed on the display 136. When the ENTER key (the carriage return key 110 when operated in the PLOTTING mode) is operated following the entry of the numerical value "3", the judgements in step S100 and step S117 become affirmative, whereby step S117 is followed by step S118 in which the desired bar graph corresponding to the numeral key "3" is selected. Subsequently in the same step S118, the display 136 provides a prompting indication asking the operator to enter auxiliary data indicating the number of groups of the numerical data of the desired graph, the total number of numerical values of the graph, and so forth. The auxiliary data entered through the keyboard 2 is stored in the first graph memory 188.

Figure 14:
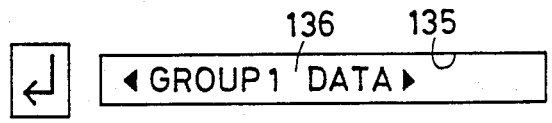
FIGS. 14 through 22 are views showing different states of indication on the display, together with the keys operated, while the graph data is entered.
Figure 15:
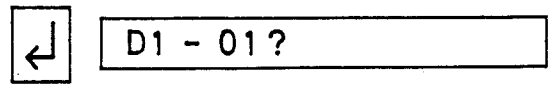
Figure 16:
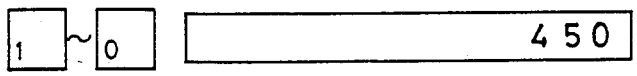

Successively, the display 136 provides a prompting indication as shown in FIG. 14, which prompts the operator to enter the GROUP 1 Data, namely, the three numerical values of the first group of graph data, D1-01, D1-02 and D1-03. With the ENTER key operated in response to the prompting indication, the display 136 provides an indication, prompting the operator to enter the first numerical value D1-01, as indicated in FIG. 15. In this embodiment, up to eight digits including a plus/-minus sign may be entered as a numerical value, by operating the appropriate numeral keys 104. The keyed-in numerical value (e.g., "450") is displayed as shown in FIG. 16. With the ENTER key 110 operated, the keyed-in numerical value is stored in the first graph memory 188. As indicated in FIG. 12, the first graph memory 188 (and also the second graph memory 186) has a succession of many memory elements each storing 8-bit coded data representative of a character such as a letter, numeral (e.g., "4") or symbol. Further, ENTER data as a result of activation of the ENTER key 110 is stored as coded data similar to the character data. Since the numerical data ("450") has been entered as indicated above, the judgement in step S117 becomes affirmative. Therefore, the ENTER data of the ENTER key 110 is stored in the first graph memory 188, as "boundary data" following the numerical data ("450"). Thus, the first numerical value (D1-02) is stored as a set of numerical data corresponding to the block D1-01 in the first row of the hypothetical table of FIG. 10.

Figure 21:
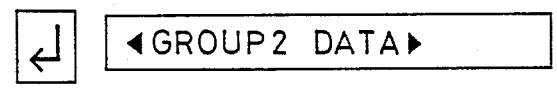
Figure 22:
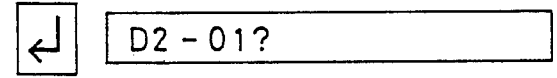

In the same manner, the second and third numerical values of the GROUP 1 Data of the graph data are entered, in response to the prompting indications as shown in FIG. 17 through FIG. 20. As a result, steps S101, S110, S100, S117 and S118 are repeated, whereby the first and third sets of the GROUP 1 Data are stored in the first graph memory 188. When the ENTER key 110 is depressed to store the third set of the GROUP 1 Data after the third numerical value has been entered, the corresponding boundary data is stored following the numerical data. Then, the display 136 provides an indication prompting the operator to enter the second group of the numerical data, i.e., GROUP 2 Data, as indicated in FIG. 21, With the ENTER key 110 depressed again in response to the prompting indication, the display 136 provides a further prompting indication, asking the operator to enter the first numerical value of the GROUP 2 Data, as illustrated in FIG. 22. Since the activation of the ENTER key 110 after the prompting indication of FIG. 21 is not preceded by an entry of data, the judgement in step S117 is negative, whereby step S117 is followed by step S119 wherein the ENTER data through activation of the ENTER key 110 is stored as "carriage return data". In other words, two successive entries of the ENTER data by successive operations of the ENTER key 110 means the "carriage return data" which separates adjacent two groups of numerical data (e.g., GROUP 1 Data and Group 2 Data) from each other, as indicated in FIG. 12. In the same manner, three numerical values of each of the second groups of numerical data (GROUP 2 Data, GROUP 3 Data and GROUP 4 Data) are stored in the first graph memory 188, together with the "boundary data" and "carriage return data".

Subsequently, the operator enters descriptive data including an indication of whether bars of the graph are hatched or not, title of the graph, identifications of the X and Y axes and the groups of numerical data (GROUP 1 through GROUP 4), and labels of items taken along the X axis, as indicated in FIG. 9. The descriptive data is entered according to prompting indications provided on the display 136, in the same manner as in the entry of numerical data previously described. The descriptive data is stored in the first graph memory 188. The individual items of the descriptive information are supposed to be accommodated in corresponding blocks of the hypothetical table, which are arranged in rows below the rows for the numerical data. After completion of entry of all graph data, the display 136 provides an indication to that effect.

Figure 7:
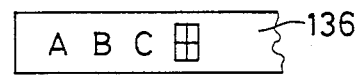
FIGS. 7 and 8 are views indicating the display on which the special symbol of FIG. 5 is displayed together with other characters.

When the graph key 154 is operated in response to the indication of completion of the graph data entry, the judgement in step S7 (FIG. 6A) becomes affirmative, and the CPU 164 goes to step S10. Since the typewriter is now placed in the PLOTTING mode, step S10 is followed by step S15. Since the graph data has been entered, the judgement in step S15 is affirmative, and step S16 is executed to check if the MEMORY mode has been established, or not. If the MEMORY mode has not been established, the CPU 164 skips steps S17 and S18, and executes step S19 to cancel the PLOTTING mode. At this point of time, however, the MEMORY mode has been established. Therefore, step S16 is followed by step S17 in which the graph data stored in the first graph memory 188 is transferred to the second graph memory 186. However, the graph data is left in the first graph memory 188. The illustration of FIG. 12 also shows the content of the second graph memory 186. Step S17 is followed by step S18 in which the special symbol data representative of the special symbol " ⊞ " is stored in the text memory 152, in order to indicate that a batch of graph data has been stored in the second graph memory 186. Further, the special symbol " ⊞ " is displayed on the display 136, as illustrated in FIG. 7. This special symbol data in the text memory 152 is "dead" character data which is not executed when the other character data in the text memory 152 are executed for recording of the corresponding characters. Namely, the special symbol is not recorded. Step S18 is followed by step S19 in which the PLOTTING mode is cancelled.

While the manner of storing a batch of graph data for the graph of FIG. 9 has been described for illustrative purpose only, any stored batches of graph data for different graphs may be retrieved based on the special symbol data stored in the text memory 152, whereby the desired batch of graph data may be displayed on the display 136 and edited, if needed. Described more specifically, the CPU 164 has a graph-designating pointer whose content is incremented each time the special symbol data is stored in the text memory 152 together with a batch of graph data. The second graph memory 186 has a plurality of memory locations for storing plural batches of graph data for various graphical representations. The content of the graph-designating pointer is changed each time special symbol data for each batch of graph data is retrieved from the text memory 152. Thus, the content of the graph-designating pointer indicates the location of the second graph memory 186 from which the corresponding batch of graph data may be retrieved. This aspect of the instant typewriter will be described in greater detail.

Figure 8:
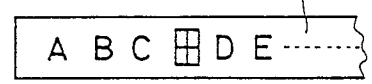
Figure 23:
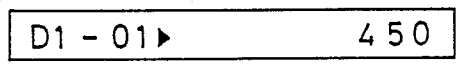
FIGS. 23 through 25 are views of different states of indication on the indicator area of the display, showing the manner in which the numerical data corresponding to the designated block of the hypothetical table is displayed.

Assuming that the display 136 provides a display as indicated in FIG. 8. When the graph key 154 is activated with the cursor of the display 136 located under the special symbol " ⊞ ", the judgement in step S7 (FIG. 6A) becomes affirmative, while the judgement in step S10 becomes negative. Consequently, the PLOTTING mode is established in step S11. Then, the CPU 164 goes to steps S12 and S13, wherein the display of the character data (retrieved from the text memory 152) is removed from the display 136, while the batch of graph data corresponding to the special symbol which has been displayed is retrieved from the second graph memory 186. As a result, the display 136 provides on its screen 137 the corresponding graph identification number. When the CURSOR DOWN key is operated in this condition, that is, when the cursor key 140 and the code key 126 are operated together, the CPU 164 goes to steps S114 and S116 of FIG. 13. Initially, the previously described auxiliary data is displayed. Then, the display 136 displays on indicator area 137 the first numerical value "450" of the first group of numerical data of the graph data which is supposed to be accommodated in the left block in the first or uppermost row of the hypothetical table of FIGS. 10 and 11, as illustrated in FIG. 23, such that the least significant digit "0" of the numerical value is located at the right end of the indicator area 137. The data "D1-01" identifying the displayed numerical value is displayed to the left of the indicator area 137. This identification data is stored in the display pattern memory 176 of the ROM 166, together with the prompting data or messages. Thus, the display 136 displays on its screen 135 the numerical data retrieved from the second graph memory 186, together with the identification data retrieved from the display pattern memory 176.

Figure 24:
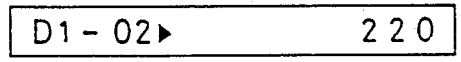
Figure 25:
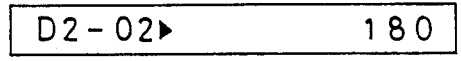

If the CURSOR RIGHT key is operated in this condition, the CPU 164 executes steps S111 and S116 wherein the CPU 164 searches for the second boundary data following the second numerical data (D1-02) in the second graph memory 186 (as indicated in FIG. 12), and thereby retrieves the second numerical data (D1-02) following the first numerical data (D1-01). As a result, the display 136 displays the corresponding numerical value "220" together with its identification data, as illustrated in FIG. 24. Thus, the numerical value corresponding to the block (D1-02) of the hypothetical table of FIG. 10 is displayed on the indicator area 137. If the CURSOR DOWN key is operated in this condition, namely, if the cursor key 140 and the code key 126 are simultaneously operated, the CPU 164 goes to steps S114 and S116 wherein the CPU 164 searches for the first carriage return data in the second graph memory 186 (FIG. 12), and then searches for the second boundary data as measured from the searched first carriage return data. In this manner, the CPU 164 retrieves from the second graph memory 186 the numerical data (D2-02) preceded by the searched boundary data, whereby the display 136 displays on its indicator area 137 the corresponding numerical value "180", as indicated in FIG. 25. The displayed numerical value is disposed to be in the block (D2-02) of the hypothetical table of FIG. 10.

As described above, the judgements in steps S102 through S105 become affirmative when the CURSOR RIGHT, CURSOR LEFT, CUSOR UP or CUSOR DOWN key is operated. In this case, step S111, S112, S113 or S114, and step S116 are executed. As a result, the numerical value corresponding to the desired block of the hypothetical table of FIG. 10 is displayed in the indicator area 137 of the display 136. To the operator, the desired numerical value is displayed as if the indicator area 137 is moved to the left or right, or up or down, from one block to the adjacent block corresponding to the desired numerical value. Thus, the display 136 is capable of effecting a scrolling operation to display the desired numerical value which is supposed to be accommodated in one of the blocks of the hypothetical table that is designated by the cursor key 138, 140, together with the code key 126 if necessary. Accordingly, any numerical value of the graph is easily searched and displayed, for example, for editing or correcting purpose. Further, the previously described descriptive and auxiliary data such as the title, labels and number of groups of the graph may also be displayed on the indicator area 137, in the same manner.

Figure 17:
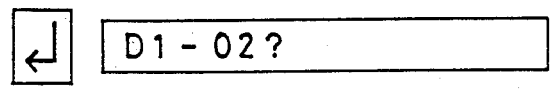
Figure 18:
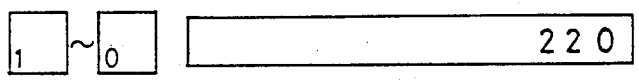
Figure 19:
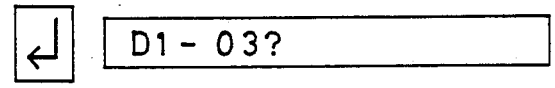
Figure 20:
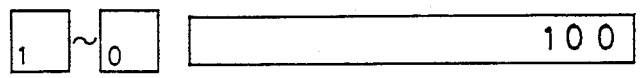

For example, if the clear key 148 is operated while the second numerical value "220" corresponding to the block (D1-02) of the hypothetical table is displayed on the display 136, the display on the display 136 is changed to the display as shown in FIG. 17, interrogating whether new numerical value is entered as the numerical data "D1-02". When the ENTER key 110 is operated after new numerical value has been entered, the newly entered value is stored in the second graph memory 186, in place of the old data. That is, the activation of the clear key 148 causes the judgement in step S106 (FIG. 13) to be affirmative, and the CPU 164 goes to step S115 to clear the input buffer memory 180 and the display buffer memory 182. The subsequent entry of the new numerical data and the activation of the ENTER key 110 cause the CPU 164 to execute steps S101, S110, S100, S117 and S118, whereby the newly entered value is stored in the second graph memory 186. The auxiliary and descriptive data except the graph identification number may also be corrected or edited.

By operating the graph key 154 after the editing operation, the PLOTTING mode is cancelled and the display on the display 136 is changed as illustrated in FIG. 8. In this condition, the display 136 displays the characters including the special symbol, according to the character data and special symbol data stored in the text memory 152. On the other hand, if the START key is operated, that is, if the space key 106 and the code key 126 are simultaneously operated after the completion of the editing operation, the CPU 164 goes to step S108 in which the graph represented by the graph data is plotted.

While the above description relates to the editing operation after the graph data has been stored in the second graph memory 186, it is also possible to effect a similar editing operation while new graph data is being entered. In this case, too, the already entered numerical values may be searched and displayed by designating the corresponding blocks of the hypothetical table of FIG. 10.

In the case where the graph key 154 and the code key 126 are operated simultaneously, the CPU 164 goes to step S8 (FIG. 6A) to retrieve the graph data from the first graph memory 188. As previously indicated, the newly entered graph data is stored in the first graph memory 188, irrespective of the MEMORY mode or NON-MEMORY mode. In this case of storage of new graph data, the first graph memory 188 is cleared when the type of graph is selected prior to entering the graph data. On the other hand, when the graph data is retrieved from the first graph memory 188 upon execution of step S9, the graph memory 188 is not cleared. In this case, the desired numerical value of the graph data may be displayed on the display 136, with the cursor keys 138, 140 (and code key 126 if appropriate), and may be edited in the same manner as previously described. If desired, the graph represented by the graph data may be plotted.

While the hypothetical table of FIG. 10 has been described in connection with graph data for a graph, it is possible to apply such a table to display pattern data such as indications as shown in FIGS. 14 and 21. In this case, the indications are supposed to be accommodated in corresponding blocks in an additional leftmost column of a hypothetical table (added to the left of the leftmost column of the table of FIG. 10). The CPU 164 retrieves the appropriate display pattern data from the display pattern memory 176 to display the corresponding indication on the display 136, when the corresponding one of the blocks in the leftmost column of the table is designated during a scrolling operation of the display 136.

In the illustrated embodiment, a desired numerical value of the stored graph data is corrected by using the clear key 148 as previously described. Since the CURSOR RIGHT and CURSOR LEFT keys 138, 140 function as designating means for designating the block of the hypothetical table corresponding to the numerical value to be corrected, the cursor on the indicator area 137 of the display 136 may not be moved by those cursor keys 138, 140. However, if separate operator-controlled means are provided for moving the cursor to the right or left on the display 136, the displayed numerical value may be edited or corrected by using the insert and delete keys 142, 144, as in an editing operation of the character data in the text memory. In this instance, the cursor is positioned at the digit position of the display 136 at which an insertion or deletion is made.

A batch or graph data stored in the second graph memory 186 may be deleted by operating the delete key 144 while the cursor is positioned at the corresponding special symbol following the characters displayed on the display 136 as indicated in FIGS. 7 and 8. In this case, the corresponding special symbol data stored in the text memory 152 is also deleted. However, it is possible that the deletion of the graph data corresponding to the deleted special symbol data is executed only after the activation of another key. Further, it is possible to insert the special symbol data at a desired position in a batch of character data in the text memory 152, by using a special symbol key, or other key together with the code key, in combination with the insert key 142.

Although the illustrated embodiment uses two successive sets of the ENTER data (produced by activation of the ENTER key 110) as "carriage return data" as illustrated in FIG. 12, the carriage return data may be replaced by the boundary data. In this instance, the desired numerical value may be searched and displayed by counting the number of the boundary data as counted from the currently designated numerical value, if the auxiliary data indicating the number of groups of numerical data of the graph data and the number of numerical values of each group are stored. If the CURSOR DOWN key is operated in the illustrated embodiment, the numerical value following the third boundary data as counted from the currently displayed value may be searched and displayed.

While the illustrated embodiment has been described in connection with the bar graph of FIG. 9, the concept of a hypothetical table may be equally applied to broken-line graph with plural data groups, vertical and horizontal band graphs, and radar chart. A simple bar graph or circular graph (pie chart) is different from the above graphs in that only one group of numerical data is represented. When the tabulation is selected for listing numerical values in a tabular form, a table to be prepared serves as the hypothetical table. In other aspects, the tabulation is handled in the same way as the plotting of a graph.

Although the illustrated embodiment is adapted to display individual numerical values of a batch of graph data on the display 136 as if the indicator area 137 is moved to from one block to another on a hypothetical table having plural rows and columns, it is possible to modify the manner of displaying the graph data as if the numerical values are arranged in a horizontal or vertical line. Further, the liquid crystal display 136 may be replaced by other suitable display means such as an electro-luminescent display or a fluorescent display tube.

The special symbol shown in FIG. 5 used in the illustrated embodiment may be replaced by other symbols which are distinct from letters and commonly used symbols. The illustrated embodiment equipped with the first graph memory 188 is advantageous in its capability of easily plotting a graph of the last entered graph data without transferring and retrieving the graph data to or from the second graph memory 186. However, the first graph memory 188 may be eliminated.

It will be obvious to those skilled in the art that various other changes, modifications and improvements may be made in the invention without departing from the spirit and scope of the invention defined in the appended claims.

What is claimed is:

1. A recording apparatus capable of recording characters and graphical representations on a recording medium with a recording instrument, comprising:

an input device through which character data and graph data are entered;

display means for displaying said character data and said graph data entered through said input device;

memory means comprising a text memory for storing said character data, and a graph memory for storing said graph data;

a recording mechanism for effecting relative movements between said recording instrument and said recording medium, for recording said characters and said graphical representations on said recording medium with said recording instrument; and control means for controlling said display means and said recording mechanism according to said character data and said graph data;

said control means being operable to store in said text memory a set of special symbol data indicative of storage of each set of said graph data in said graph memory corresponding to each one of said graphical representations, said control means being further operable to control said display means so as to display a special symbol represented by said special symbol data, together with said characters represented by said character data, said control means inhibiting said recording mechanism from recording said special symbol when said recording mechanism is activated to record said characters according to said character data.

2. A recording apparatus according to claim 1, further comprising means for erasing said graph data in said graph memory when said special symbol data in said text memory is erased.

3. A recording apparatus according to claim 1, wherein said input device comprises operator-controlled means for displaying on said display means said graph data in place of said special symbol, said control means retrieving said graph data from said graph memory and displaying said graph data on said display means, when said operator-controlled means is operated while said special symbol is displayed on said display means.

4. A method of selectively displaying, on an indicator area of display means of a recording apparatus, one of a plurality of numerical values of one of plural groups of numerical data which are represented in a graphical or tabular form and which are stored in memory means, comprising the steps of:

designating one of a plurality of blocks of a hypothetical table which is defined by a plurality of rows and a plurality of columns such that said blocks of said hypothetical table accommodate said numerical values of said plural groups of numerical data, respectively;

retrieving one of said numerical values from said memory means when the corresponding block of said hypothetical table is designated;

displaying said one numerical value on said indicator area;

designating another of said blocks of said hypothetical table which is located adjacent to said one block;

retrieving from said memory means another of said numerical values which corresponds to another block of said hypothetical table; and displaying said another numerical value on said indicator area as if said indicator area and said hypothetical table are moved relative to each other such that said indicator area is moved from said one block to said another block of said hypothetical table.

5. A recording apparatus capable of recording characters and graphical representations on a recording medium with a recording instrument, said graphical representations including a graph which represents plural groups of numerical data, each of said plural groups of numerical data consisting of a plurality of numerical values, said recording apparatus comprising:

an input device through which character data and graph data are entered, said graph data including said plural groups of numerical data;

display means for displaying said character data and said group data entered through said input device, said display means including at least one indicator area adapted to display said numerical values one at a time;

memory means comprising a text memory for storing said character data, and a graph memory for storing said graph data;

a recording mechanism for effecting relative movements between said recording instrument and said recording medium, for recording said characters and said graphical representations on said recording medium with said recording instrument;

control means for controlling said display means and said recording mechanism according to said character data and said graph data;

said control means being operable to store in said text memory a set of special symbol data indicative of a storage of said graph data in said graph memory, said special symbol data corresponding to each one of said graphical representations, said control means being further operable to control said display means so as to display a special symbol represented by said special symbol data, together with said characters represented by said character data;

designating means for designating one of a plurality of blocks of a hypothetical table which is defined by a plurality of rows and a plurality of columns, said blocks of said hypothetical table accommodating said numerical values of said plural groups of numerical data, respectively, said display means displaying said numerical values on said indicator area when the corresponding blocks are designated by said designating means; and indication control means operable while one of said numerical values which corresponds to said one block designated by said designating means is displayed on said indicator area of said display means, for retrieving from said graph memory another of said numerical values of said plural groups of numerical data which corresponds to another block of said hypothetical table, when said another block is designated by said designating means, said another block being located adjacent to said one block, and for operating said display means to display on said indicator area said another numerical value retrieved from said graph memory, whereby said another numerical value is displayed as if said indicator area is moved from said one block to said another block of said hypothetical table.

6. A recording apparatus according to claim 5, wherein said control means comprises a graph-designating memory pointer whose content is incremented each time said special symbol data is stored in said text memory together with said graph data for each of said graphical representations, said graph memory has a plurality of memory locations for storing plural batches of graph data corresponding to said graphical representations, respectively, and said input device includes operator-controlled means for changing said content of said memory pointer, said control means retrieving one of the plural batches of graph data from one of said memory locations which is designated by said content of said memory pointer, said control means operating said display means to display the retrieved batch of graph data.

7. A recording apparatus capable of recording graphical representations and/or data tables on a recording medium with a recording instrument, comprising:

an input device through which plural groups of numerical data are entered for one of said graphical representations and/or data tables, each one of said plural groups of numerical data consisting of a plurality of numerical values;

memory means for storing said plural groups of numerical data entered through said input device;

a recording mechanism for effecting relative movements between said recording instrument and said recording medium, for recording said graphical representations and/or data tables on said recording medium with said recording instrument;

recording control means for controlling said recording mechanism according to said plural group of numerical data stored said memory means;

display means including at least one indicator area adapted to display said numerical values of said plural groups of numerical data, one value at a time;

designating means for designating one of a plurality of blocks of a hypothetical table which is defined by a plurality of rows and a plurality of columns, said blocks of said hypothetical table accommodating said numerical values of said plural groups of numerical data, respectively, said display means displaying said numerical values on said indicator area when the corresponding blocks are designated by said designating means; and indication control means operable while one of said numerical values which corresponds to said one block designated by said designating means is displayed on said indicator area of said display means, for retrieving from said memory means another of said numerical values of said plural groups of numerical data which corresponds to another block of said hypothetical table, when said another block is designated by said designating means, said another block being located adjacent to said one block, and for operating said display means to display on said indicator area said another numerical value retrieved from said memory means, whereby said another numerical value is displayed as if said indicator area and said hypothetical table are moved relative to each other such that said indicator area is moved from said one blcok to said another block of said hypothetical table.

8. A recording apparatus according to claim 7, wherein said input device comprises operator-controlled means for storing a set of boundary data following each one of said numerical values of said each group of numerical data in said memory means, and for storing a set of carriage return data following each one of said plural groups of numerical data in said memory means, said indication control means retrieving said another numerical value from said memory means according to said set of boundary data if said another block is in the same row as said one block, or according to said set of boundary data and said set of carriage return data if said another block is in the same column as said one block.

9. A recording apparatus according to claim 8, wherein said carriage return data consists of two successive sets of said boundary data.

10. A recording apparatus according to claim 7, wherein said memory means comprises a first graph memory for storing a batch of said plural groups of numerical data for the graphical representation or table which has been entered last, and a second graph memory for storing plural batches of numerical data each of which is transferred from said first graph memory when the batch of numerical data for each new graphical representation or table is entered through said input device into said first memory.

* * * * *